K. RUSHTON.
CENTER BEARING FOR TRUCKS.
APPLICATION FILED JUNE 29, 1916.
1,205,788.
Patented Nov. 21, 1916.
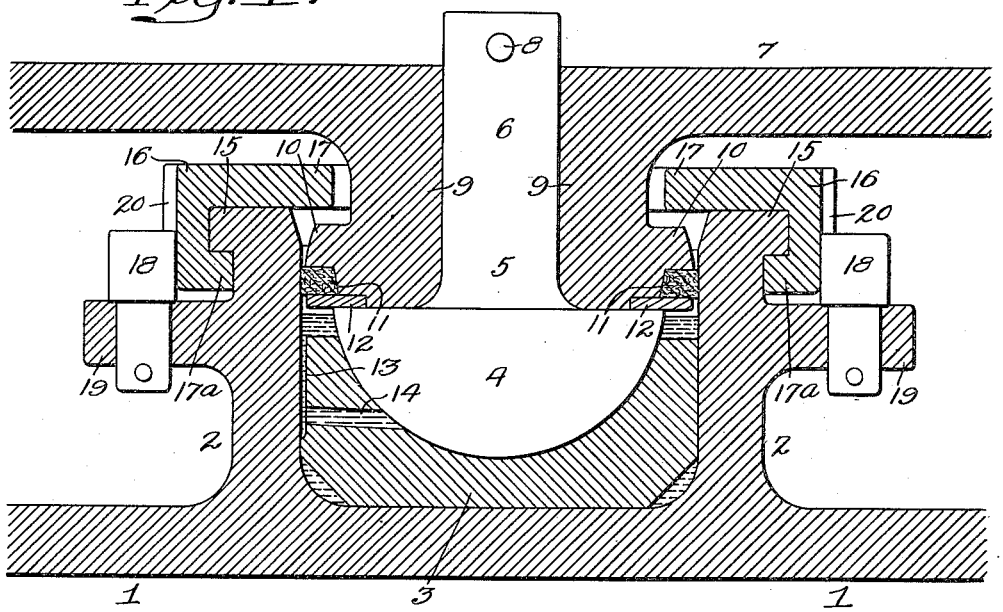
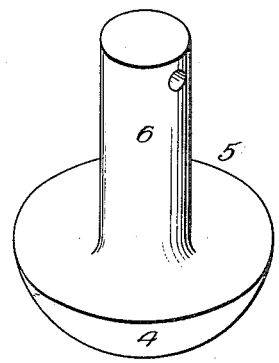
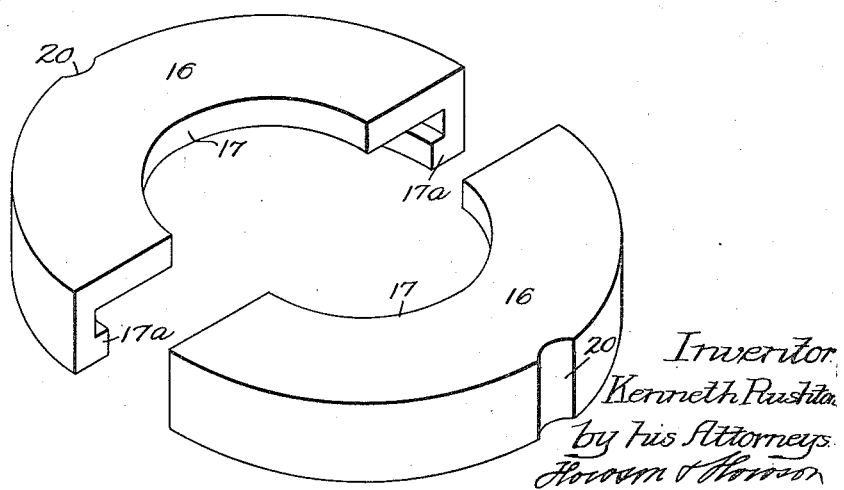
Inventor
Kenneth Rushton
by his Attorneys
Howson & Howson

UNITED STATES PATENT OFFICE.

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

CENTER-BEARING FOR TRUCKS.

1,205,788.  Specification of Letters Patent.  Patented Nov. 21, 1916.

Application filed June 29, 1916.   Serial No. 106,655.

*To all whom it may concern:*

Be it known that I, KENNETH RUSHTON, a citizen of the United States, residing in Philadelphia, Pennsylvania, have invented certain Improvements in Center-Bearings for Trucks, of which the following is a specification.

My invention relates to certain improvements in center bearings for trucks of the type in which the hemispherical member is adapted to a bearing block.

One object of my invention is to improve the construction of this type of center bearing.

A further object of the invention is to provide means for preventing dust from entering the bearing and to prevent the escape of lubricant from the bearing chamber.

A still further object of the invention is to provide means for limiting the vertical movement of one part in respect to the other.

In the accompanying drawings:—Figure 1, is a vertical sectional view of a center bearing illustrating my invention; Fig. 2, is a detached perspective view of the center pin; and Fig. 3, is a detached perspective view of the two-part retaining plate.

Referring to the drawing, 1 is the truck bolster having a casing 2, in the present instance forming an integral part thereof and having a cavity in which is located the bearing block or socket 3 having a concaved recess therein in which fits the hemispherical portion 4 of the center pin 5. This center pin has a spindle 6 which extends through the opening in the body bolster 7 secured in the ordinary manner to the car body. A pin 8 is used to prevent the center pin dropping out when the car and truck are separated for repairs. The spindle has an extended bearing in the portion 9 of the body bolster. This portion has an annular flange 10 extending into the upper portion of the cavity in the casing 2, and secured to this flange is an annular packing ring 11 held in place by a plate or ring 12. The packing does not interfere with the free movement of one part of the bearing with relation to the other, but prevents the escape of oil from the cavity and prevents dust from entering the bearing proper.

In the bearing block 2 is a vertical recess 13, which connects with the horizontal passage 14 leading to the bearing surface, so that the bearing will be thoroughly lubricated. In order to prevent the parts from accidentally separating, I provide the casing with an external flange 15 at its upper edge and apply to the flange a two-part ring 16, shaped as clearly shown in Fig. 3. The portion 17 of the ring extends over the flange 10 on the extension of the body bolster, while the portion 17ª extends under the flange 15. Pins 18 are driven through openings in the lugs 19 on the casing 2 and retain the two parts of the ring in position. The heads of the pins rest in grooves 20 in the parts of the ring, as clearly shown in the drawing, and the pins may be secured to the lugs in any suitable manner.

By the above arrangement, it will be seen that I am enabled to make a very simple center bearing in which the bearing proper is thoroughly lubricated and one part has a universal movement with respect to the other part. I also provide simple means for holding the parts in position.

I claim:—

1. The combination of a truck bolster having a casing; the casing having a cavity therein; a body bolster having a depending portion mounted in the cavity of the truck bolster; a center pin having an enlarged hemispherical end; a bearing block mounted in the cavity having a recess to receive the hemispherical end of the center pin; an annular packing ring carried by the depending portion of the body bolster directly above the hemispherical end of the pin; and means for securing the ring in position.

2. The combination in a center bearing for trucks, of a casing carried by the truck and having a cavity therein; a bearing block mounted in the cavity; a body bolster having a depending portion entering the cavity and having an external flange; a packing ring secured to the flange and bearing against the walls of the cavity; a center pin mounted in the extension of the body bolster and having a hemispherical end adapted to the bearing block; a two-part ring secured to the casing and extending over the flange of the extension of the body bolster; and means for holding the ring in position.

3. The combination in a center bearing for trucks, of a truck bolster; a casing thereon, said casing having a cavity therein and having an external flange at its upper edge and lugs; a bearing block mounted in the cavity and having a recess therein; a body bolster having an extension provided with a flange at its lower edge, said flanged extension projecting into the cavity in the casing; a packing ring carried by the flange and bearing against the walls of the cavity; a center pin mounted in the extension of the body bolster and having a hemispherical end located in the bearing block; a two-part ring arranged to engage the flange in the upper end of the casing and projecting over the flange on the extension of the body bolster, each part of the ring having recesses therein; and retaining pins adapted to the recesses and extending through openings in the lugs on the casing.

KENNETH RUSHTON.